(12) United States Patent
Grimsrud et al.

(10) Patent No.: US 6,934,807 B1
(45) Date of Patent: Aug. 23, 2005

(54) DETERMINING AN AMOUNT OF DATA READ FROM A STORAGE MEDIUM

(75) Inventors: Knut S. Grimsrud, Forest Grove, OR (US); Amber D. Huffman, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/541,115

(22) Filed: Mar. 31, 2000

(51) Int. Cl.⁷ .............................................. G08F 12/00
(52) U.S. Cl. ...................... 711/137; 711/154; 711/146; 711/150
(58) Field of Search ................................ 711/137, 154, 711/150, 146, 169, 114, 14.1

(56) References Cited

U.S. PATENT DOCUMENTS

| | | |
|---|---|---|
| 5,146,582 A | 9/1992 | Begun .................... 712/229 |
| 5,367,656 A | 11/1994 | Ryan |
| 5,473,761 A | 12/1995 | Parks et al. |
| 5,483,641 A | 1/1996 | Jones et al. |
| 5,588,128 A | 12/1996 | Hicok et al. |
| 5,619,723 A | 4/1997 | Jones et al. |
| 5,649,153 A | 7/1997 | McNutt et al. |
| 5,708,849 A | 1/1998 | Coke et al. |
| 5,721,865 A | 2/1998 | Shintani et al. |
| 5,802,593 A | 9/1998 | Grimsrud |
| 5,809,560 A | 9/1998 | Schneider |
| 5,822,568 A | 10/1998 | Swanstrom |
| 5,835,783 A | 11/1998 | Grimsrud |
| 5,845,297 A | 12/1998 | Grimsrud et al. |
| 5,881,303 A | 3/1999 | Hagersten et al. |
| 6,006,307 A | * 12/1999 | Cherukuri ................... 711/114 |
| 6,085,287 A | 7/2000 | O'Neil et al. |
| 6,195,726 B1 | 2/2001 | Hogan |
| 6,449,111 B1 | 9/2002 | Kool et al. |

FOREIGN PATENT DOCUMENTS

| | | |
|---|---|---|
| CN | 1029047 C | 6/1995 |
| WO | WO 99/34356 | 7/1999 |

OTHER PUBLICATIONS

V. Soloviev, Prefetching in Segmented Disk Cache for Multi-Disk Systems, 1996, North Dakota State University.
A. Tomkins et al., Informed Multi-Process Prefetching and Caching, 1997, Carnegie Mellon University.
Chinese Office Action dated Mar. 11, 2004.

* cited by examiner

*Primary Examiner*—Donald Sparks
*Assistant Examiner*—Brian R. Peugh
(74) *Attorney, Agent, or Firm*—Fish & Richardson P.C.

(57) ABSTRACT

Data is read in response to a request for a predetermined amount of data. The amount of data that has been read is determined prior to completing reading the predetermined amount of data. The predetermined amount of data may include prefetch data and demand data, where demand data is data for a computer program and prefetch data is data adjacent to the demand data.

42 Claims, 5 Drawing Sheets

DETERMINING AN AMOUNT OF DATA READ FROM A STORAGE MEDIUM

BACKGROUND

This invention relates to determining an amount of data that has been read from a storage medium while a data transfer is in progress.

When reading data from a storage medium, such as a hard disk, a device driver reads the requested data, called "demand data", optionally along with speculative data from other locations on the hard disk. The data from the other locations is called "prefetch data" and corresponds to addresses on the hard disk that are likely to be read next by the device driver (typically contiguous/sequential data).

DESCRIPTION OF THE DRAWINGS

Like reference symbols in the various drawings indicate like elements.

DETAILED DESCRIPTION

Figure 1:
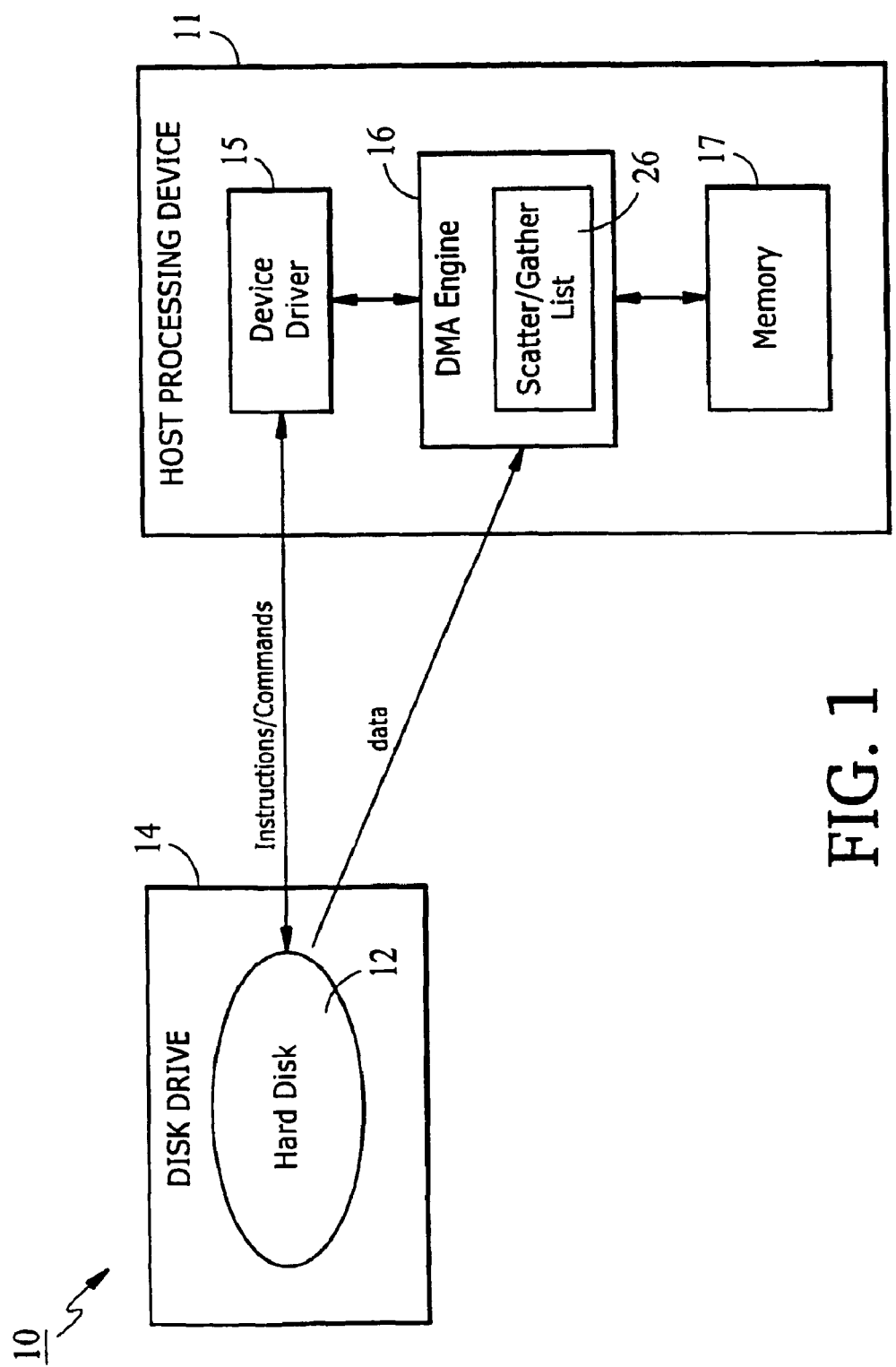
FIG. 1 is a block diagram of a disk drive and a host processing device.

Referring to FIG. 1, block diagram 10 shows a host processing device 11 reading data from a hard disk 12 of a disk drive 14. Disk drive 14 may reside within host processing device 11 or it may be an external drive.

Software (device driver) 15 executing in host processing device 11 receives requests from applications or other computer program(s) (not shown) executing on host processing device 11. These requests instruct device driver 15 to read data from locations on hard disk 12 of disk drive 14. Data is transferred from these locations back to a Direct Memory Access ("DMA") engine 16 also on host processing device 11. DMA engine 16 consults a table, such as scatter/gather list 26, to determine where in memory 17 to store the received data. Scatter/gather list 26 includes lists of addresses in memory 17 into which data from hard disk 12 is to be stored.

Figure 2:
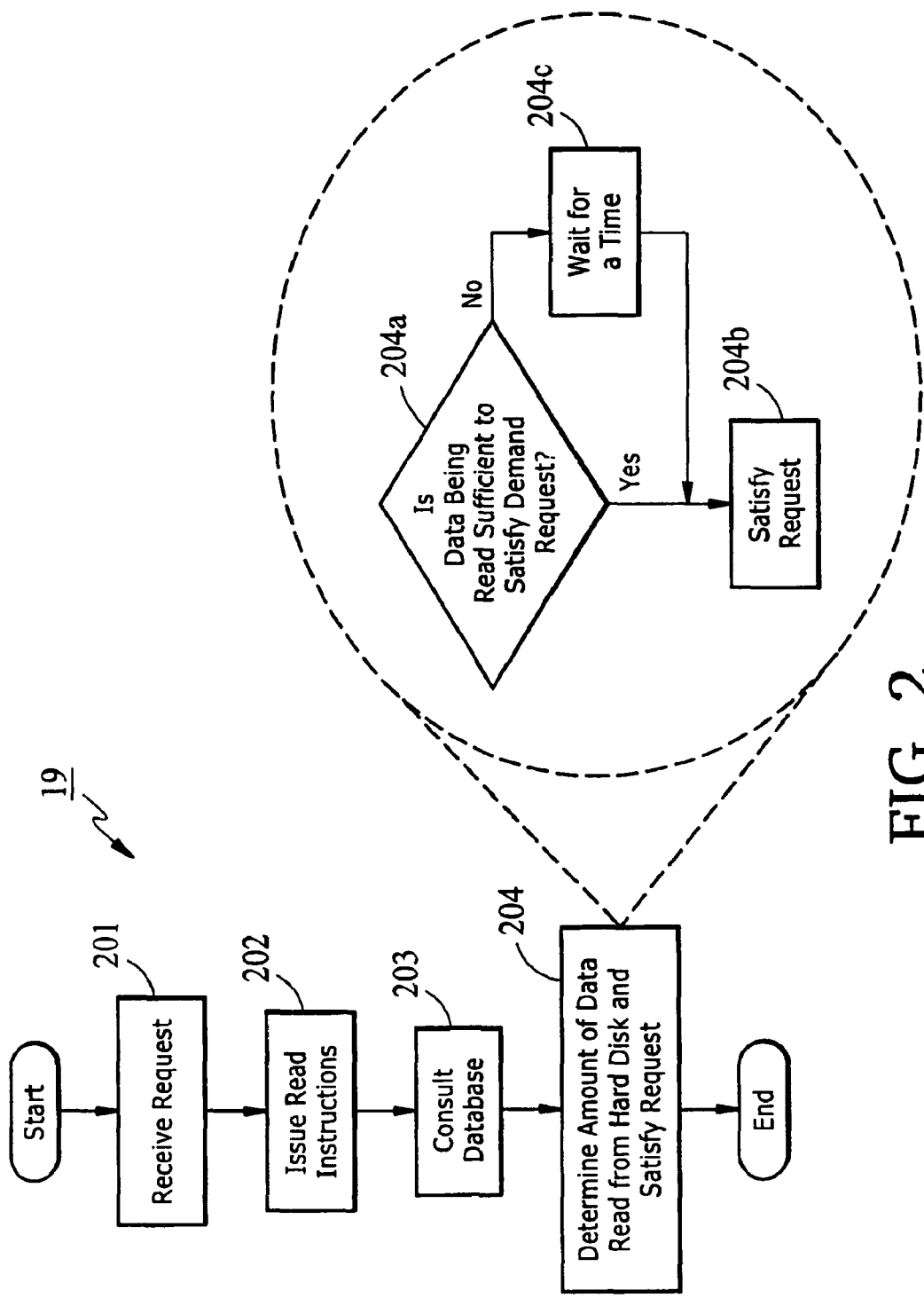
FIG. 2 is a flow diagram showing a process for reading data from the disk drive.

In FIG. 2, a process 19 is shown for reading data from hard disk 12. Device driver 15 receives (201) a request from software (a computer program) on host processing device 11. The request identifies an amount of demand data (the "demand request") at addresses of hard disk 12, and instructs device driver 15 to read the demand data from hard disk 12. Device driver determines the location and amount of prefetch data to be read from hard disk 12 based on the location and/or amount of demand data and adds this information (the "prefetch request") to the original request.

Figure 3:
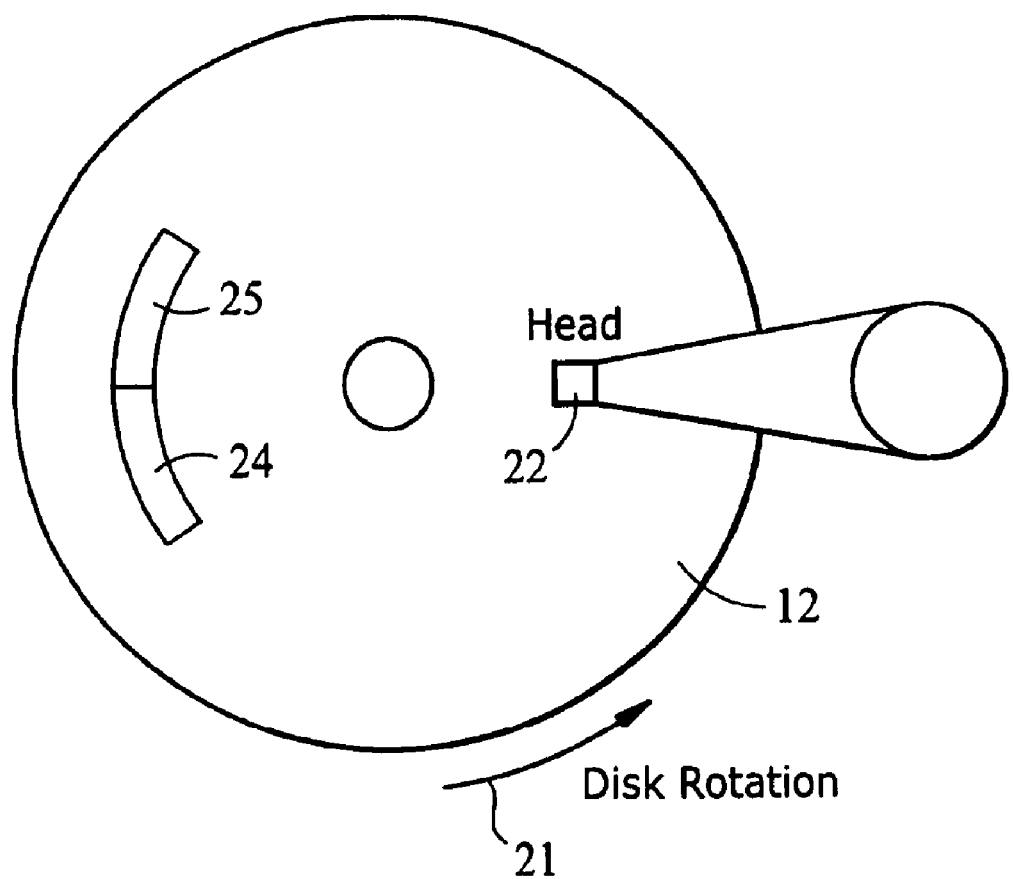
FIG. 3 is a top view of a hard disk and a transducer head in the disk drive.

Demand and prefetch data are typically, but not necessarily, contiguous data blocks. The demand data typically precedes the prefetch data (i.e., the prefetch data is retrieved after the demand data) in a direction of movement of hard disk 12. For example, as shown in FIG. 3, hard disk 12 rotates in a direction of arrow 21 during reading. A transducer head 22 on disk drive 14 reads data from tracks on hard disk 12 during rotation. Since the transducer head encounters demand data 24 before prefetch data 25 (as a result of the direction of rotation of hard disk 12), demand data 24 is read first. Prefetch data 25 is read on the assumption that the next data requested by host processor software will be the data that follows data 24.

Returning to FIG. 2, in response to the request received in 201, device driver 15 issuing read instructions (202) for demand data 24 and prefetch data 25 from hard disk 12. A program resident in a controller (not shown) on disk drive 14 provides the data to DMA engine 16 in response to the read instructions. DMA engine 16 then consults (203) a database, namely scatter/gather list 26, to determine where in memory 17 to store the data read in 202. Device driver 15 programs DMA engine 16 with scatter/gather list 26 prior to issuing the read instructions to hard disk 12. Scatter/gather list 26 includes entries which specify destination buffers (regions of memory 17) into which the demand data and the prefetch data are to be placed. The destination regions of memory may not be contiguous, in which case DMA engine 16 is programmed with multiple entries, one for each discontiguous region.

DMA engine 16 consults (203) scatter/gather list 26 periodically as blocks (associated with "LBAs", or "Logical Block Addresses") of data are read. The frequency at which scatter/gather list 26 is consulted may vary depending upon the size of the blocks of data.

Device driver 15 determines (204) the amount of data that has been read from hard disk 12 and satisfies a request based on the data. This may be done at any time during the reading process and it may be done in a number of ways. For example, DMA engine 16 may include a counter, which keeps track of the amount of data that has been read by counting the number of bytes transferred from hard disk 12 to host memory. Device driver 15 may monitor the current DMA transfer location via the counter to determine how much data has been stored in memory 17 since the start of the current reading operation and, thus, how much data has since been received from hard disk 12. Basically, device driver 15 checks DMA engine 16 to see how far along the DMA engine is in storing data from the current transfer operation.

Device driver 14 can determine (204) the amount of data that has been read before a request for demand and/or prefetch data has been fully satisfied. Device driver 14 can then use this information to satisfy requests for data immediately, without waiting for all of the data to be read in response to the original request. For example, assume that a prefetch request has been issued for 64 kilobytes (KB) of data and is currently being satisfied (i.e., data is being read in response to the prefetch request). While the prefetch request is being satisfied, a demand request for 4 KB of data is received. These 4 KB constitute data that is part of the prefetch request. If the 4 KB of data have already been retrieved in response to the prefetch request, then the 4 KB of data can be transferred to the requestor (e.g., a software program) immediately to satisfy the request for 4 KB of demand data. Thus, there is no need to wait for the prefetch request for 64 KB of data to be completed before transferring the 4 KB of demand data. If the 4 KB of data have not yet been retrieved in response to the prefetch request, the 4 KB are transferred immediately when they are retrieved. This feature increases the operational efficiency of disk drive 10, since it eliminates the need to wait for an entire prefetch request to be completed before satisfying a demand request.

Another advantage associated with knowing how much data has been transferred at any given time relates to storing prefetch data. For example, sequential prefetch data may be read in response to a first request for data, where "sequential prefetch data" refers to data that follows demand data in sequence (see data 25 of FIG. 3). If a second request is for non-sequential data, meaning data that does not follow the demand data in sequence, the prefetch request may be aborted and the prefetch data that has been read up to that point can be stored in memory 17. Since the amount of data that has been transferred is known, a record is maintained of the data that has been read and, thus, that data does not have to be re-read from hard disk 12 if it is needed. Heretofore, aborting a prefetch request in progress would result in such data typically being discarded, resulting in the need to re-read the data if that data was subsequently needed.

Accordingly, determining (204) may include the following. Device driver 15 determines (204a) if data that is currently being prefetched can be used to satisfy a demand request. In particular, device driver 15 consults DMA engine 16 to determine if the amount of data that has been read up to that point is sufficient to satisfy the demand request. If the amount of data is sufficient to satisfy the demand request, device driver 15 satisfies (204b) the request by transferring that data from a prefetch buffer portion of memory 17 to whatever computer program issued the original request. The data is transferred immediately without waiting for the prefetch request to be completed. If there is not sufficient data to satisfy the demand request, device driver 15 waits (204c) until sufficient data has been read and then satisfies (204c) the request as soon as that data has been read. Again, it is not necessary to wait until the entire prefetch request has been satisfied. Representative pseudo-code for implementing this process is shown in the attached Appendix.

Figure 4:
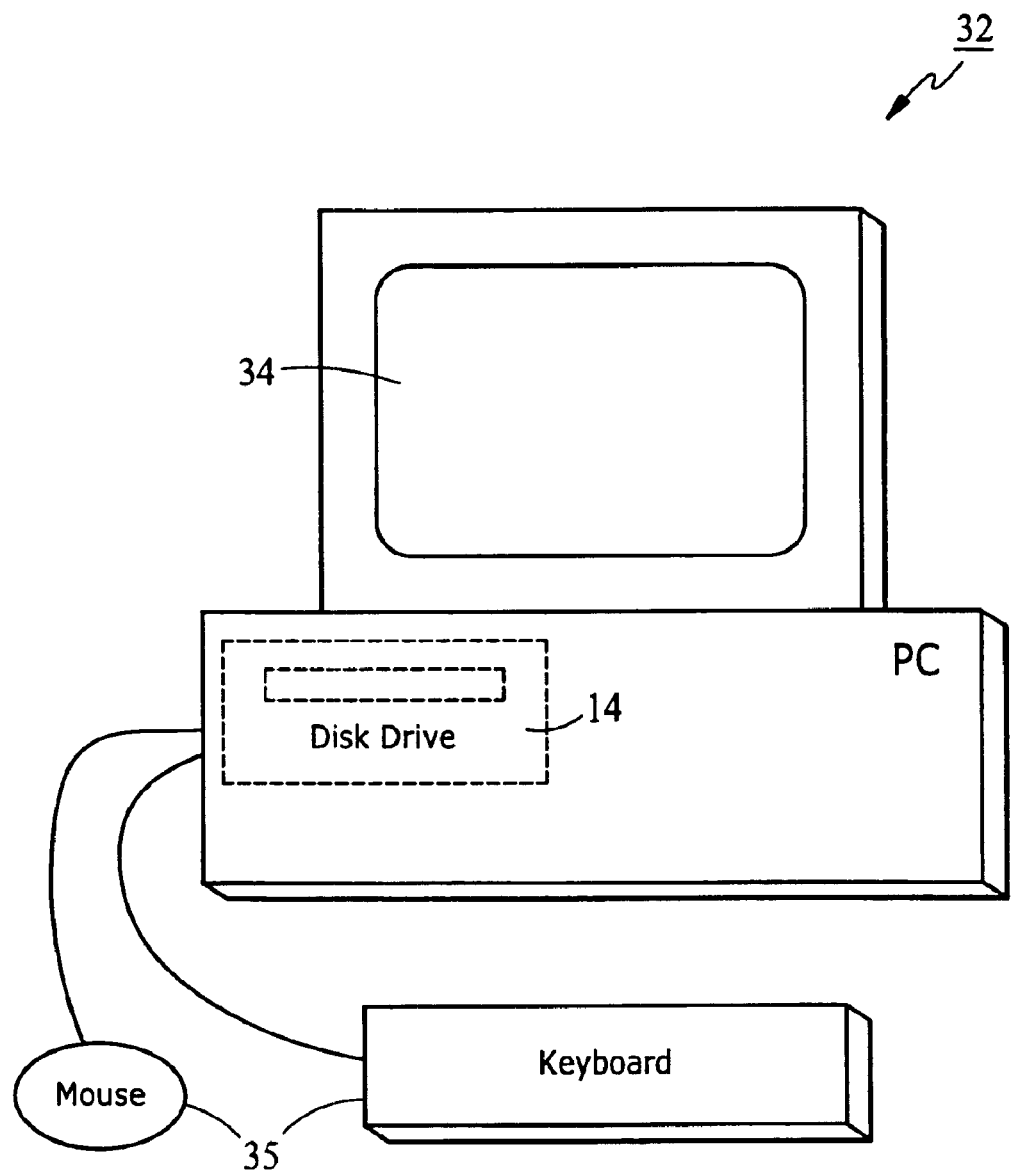
FIG. 4 is a front view of a computer which can function as the host processing device.

Hardware on which process 19 may be implemented is shown in FIG. 4. Personal computer ("PC") 32 includes disk drive 14 which reads and writes data on a hard disk, a display screen 34 which displays information, and input devices 35 which input data. A processor 36 (FIG. 5) in PC 32 runs device driver 15 and acts as the host processing device. DMA engine 16 uses scatter/gather list 26 (stored in memory 17).

Figure 5:
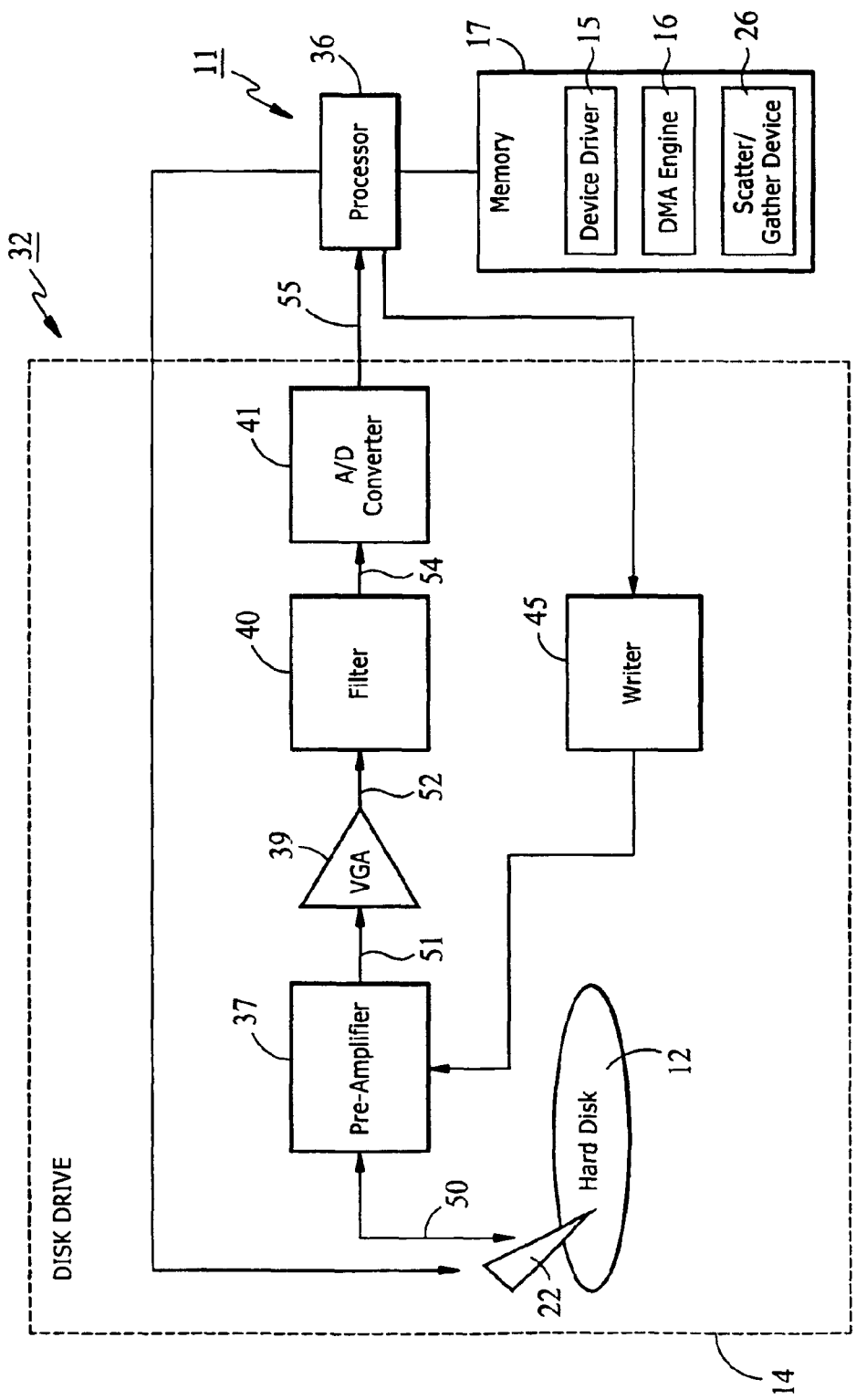
FIG. 5 is a block diagram of hardware included in the disk drive and the host processing device.

FIG. 5 also shows components of disk drive 14. Among these components are hard disk 12, transducer head 22, pre-amplifier 37, analog variable gain amplifier ("VGA") 39, filter 40, analog-to-digital ("A/D") converter 41, processor 36 (including memory 17), and writer 45.

Hard disk 12 is a magnetic disk having concentric data storage channels defined on each of its storage surfaces. Hard disk 12 is rotated inside disk drive 14 while data is read from/written to its channels. Although only one hard disk 12 is shown, more than one disk may be included in disk drive 14.

Transducer head 22 is a magneto-resistive head (or similar device) that is capable of reading data from, and writing data to, hard disk 12. Transducer head 22 is associated in a "flying" relationship over a storage surface of hard disk 12, meaning that it is movable relative to, and over, the storage surface in order to read and write data.

To read data from hard disk 12, device driver 15 (executing in processor 36) sends a signal to transducer head 22 to move transducer head 22 to locations on hard disk 12 from which data is to be read (process 19).

Transducer head 22 senses flux transitions as it moves in proximity to locations on hard disk 12. These flux transitions 50 are provided to pre-amplifier 37. Pre-amplifier 37 is a voltage pre-amplifier that amplifies the flux transitions from millivolts (mV) to volts (V). The resulting pre-amplified analog signal (or "read" signal) 51 is provided to VGA 39. VGA 39 amplifies read signal 51 and provides a resulting amplified read signal 52 to filter 40.

Filter 40 is a filter/equalizer that generates a substantially square wave from amplified read signal 52. Resulting filtered signal 54 is subjected to sampling and quantization within high-speed A/D converter 41. A/D converter 41 outputs digital data 55 generated from signal 54. Data 55 corresponds to the data stored on hard disk 12.

Writer 45 is provided for writing data to hard disk 12 (via transducer head 22). Memory 17 stores computer instructions (including software for device driver 15) for implementing process 19. Memory 17 also stores scatter/gather list 26.

Process 19 is not limited to use with the foregoing hardware and software configurations; it may find applicability in any computing or processing environment. Process 19 may be implemented in hardware, software, or a combination of the two. Process 19 may be implemented in one or more computer programs executing on programmable computers that each include a processor, a storage medium readable by the processor (including volatile and non-volatile memory and/or storage elements), at least one input device, and one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., hard disk or magnetic diskette) that is readable by a general or special purpose programmable computer for configuring and operating the computer when the storage medium or device is read by the computer to perform process 19. Process 19 may also be implemented as a computer-readable storage medium, configured with a computer program, where, upon execution, instructions in the computer program cause the computer to operate in accordance with process 19.

Other embodiments not specifically described herein are also within the scope of the following claims. For example, process 19 can be used to access data stored on other storage media, including optical media, such as CDs ("Compact Disks"), DVDs ("Digital Video Disks"), and DLT ("Digital Linear Tape"). Device driver 15 may be an ATA ("Advanced Technology Attachment") driver. Process 19 may be executed in a different order from that shown and/or one or more blocks thereof may be executed concurrently. Additionally, while the invention has been described in the context of reading data from a storage medium, it can also be used in writing data to a storage medium.

APPENDIX

```
Procedure  PerformDiskRequest(DiskBlockNumber, Transfer Length)
{
    If (DiskisBusyWithPrefetch( ) &&
    PrefetchLocation==DisBlockNumber)
    {
        If (DMAProgress)>=TransferLength)
            //This is the optimized early demand completion
            SatisfyRequestFromPrefetchBuffer( ) ;
            Return;
    }
    else
    {
```

APPENDIX-continued

```
        WaitForPrefetchToComplete( ) ;
            //Alternatively, this could be: while
            // (DMAProgress<TransferLength)
        SatisfyRequestFromPrefetchBuffer( ) ;
        Return;
        }
    }
    else
    {
        WaitforDiskIdle( ) ;
        GetDemandDatafromDisk(DiskBlockNumber,
        TransferLength) ;
        StartPrefetchAtLocation(DiskBlockNumber +
        TransferLength) ;
    }
}
```

What is claimed is:

1. A method comprising:
  initiating a reading of prefetch data in response to a request for prefetch data;
  before completion of the reading of prefetch data, receiving a request for demand data; and
  satisfying the request for demand data by providing at least a portion of the prefetch data prior to completing reading of all of the prefetch data.

2. The method of claim 1, further comprising determining an amount of prefetch data that has been read prior to completing reading all of the prefetch data;
  wherein determining comprises keeping track of the prefetch data as the prefetch data is read.

3. The method of claim 1, further comprising determining an amount of prefetch data that has been read prior to completing reading all of the prefetch data;
  wherein determining comprises maintaining a count of prefetch data that has been read.

4. The method of claim 1, wherein the demand data comprises data for a computer program and the prefetch data comprises data adjacent to the demand data.

5. The method of claim 1, wherein the request for demand data is satisfied without substantial delay using the prefetch data.

6. The method of claim 1, wherein, if the amount of prefetch data that has been read is not sufficient to satisfy the request for demand data, the method further comprises waiting for an amount of prefetch data to be read that is sufficient to satisfy the request for demand data.

7. The method of claim 1, further comprising:
  receiving a second request for prefetch data, the prefetch data associated with the second request being out of sequence relative to the prefetch data associated with a first request for prefetch data; and
  storing an amount of prefetch data that has been read in response to the first request up to a point at which the second request is received.

8. An article comprising a machine-readable storage medium which stores executable instructions that cause a machine to:
  initiate a read of prefetch data in response to a request for prefetch data;
  before completion of the read of prefetch data, receive a request for demand data; and
  satisfy the request for demand data by providing at least a portion of the prefetch data prior to completing reading of all of the prefetch data.

9. The article of claim 8, further comprising instructions to determine an amount of prefetch data that has been read prior to completing reading all of the prefetch data;
  wherein determining comprises keeping track of the prefetch data as the prefetch data is read.

10. The article of claim 8, further comprising instructions to determine an amount of prefetch data that has been read prior to completing reading all of the prefetch data;
  wherein determining comprises maintaining a count of prefetch data that has been read.

11. The article of claim 8, wherein the demand data comprises data for a computer program and the prefetch data comprises data adjacent to the demand data.

12. The article of claim 8, wherein the request for demand data is satisfied without substantial delay using the prefetch data.

13. The article of claim 8, wherein, if the amount of prefetch data that has been read is not sufficient to satisfy the request for demand data, the instructions cause the machine to wait for an amount of prefetch data to be read that is sufficient to satisfy the request for demand data.

14. The article of claim 8, further comprising instructions that cause the machine to:
  receive a second request for prefetch data, the prefetch data associated with the second request being out of sequence relative to the prefetch data associated with a first request for prefetch data; and
  store an amount of prefetch data that has been read in response to the first request up to a point at which the second request is received.

15. An apparatus comprising:
  a memory which stores executable instructions; and
  a processor which executes the instructions to:
  initiate a read of prefetch data in response to a request for prefetch data;
  prior to completion of the read, receive a request for demand data; and
  satisfy the request for demand data by providing at least a portion of the prefetch data prior to completing reading of all of the prefetch data.

16. The apparatus of claim 15, wherein the processor executes instructions to determine an amount of prefetch data that has been read prior to completing reading all of the prefetch data; and
  wherein determining comprises keeping track of the prefetch data as the prefetch data is read.

17. The apparatus of claim 15, wherein the processor executes instructions to determine an amount of prefetch data that has been read prior to completing reading all of the prefetch data; and
  wherein determining comprises maintaining a count of prefetch data that has been read.

18. The apparatus of claim 15, wherein the demand data comprises data for a computer program and the prefetch data comprises data adjacent to the demand data.

19. The apparatus of claim 15, wherein the request for demand data is satisfied without substantial delay using the prefetch data.

20. The apparatus of claim 15, wherein, if the amount of prefetch data that has been read is not sufficient to satisfy the request for demand data, the processor executes instructions to wait for an amount of prefetch data to be read that is sufficient to satisfy the request for demand data.

21. The apparatus of claim 15, wherein the processor executes instructions to:

receive a second request for prefetch data, the prefetch data associated with the second request being out of sequence relative to the prefetch data associated with a first request for prefetch data; and store an amount of prefetch data that has been read in response to the first request up to a point at which the second request is received.

22. A method comprising:

reading data in response to a request for a predetermined amount of data, the predetermined amount of data comprising prefetch data and demand data, the demand data comprising data for a computer program and the prefetch data comprising data adjacent to the demand data;

determining an amount of data that has been read prior to completing reading the predetermined amount of data; and satisfying a request for the demand data based on the amount of data that has been read prior to completing reading the predetermined amount of data;

wherein, if the amount of data that has been read is not sufficient to satisfy the request for the demand data, the method further comprises waiting for an amount of data to be read that is sufficient to satisfy the request for the demand data.

23. The method of claim 22, wherein determining comprises keeping track of the data as the data is read.

24. The method of claim 22, wherein determining comprises-maintaining a count of data that has been read.

25. A method comprising:

reading data in response to a request for a first predetermined amount of data;

determining an amount of data that has been read prior to completing reading the first predetermined amount of data;

receiving a second request for a second predetermined amount of data, the second predetermined amount of data being out of sequence relative to the first predetermined amount of data; and storing an amount of data that has been read up to a point at which the second request is received.

26. The method of claim 25, wherein the first and second predetermined amounts of data comprise different sets of prefetch data and demand data, the demand data comprising data for a computer program and the prefetch data comprising data adjacent to the demand data.

27. The method of claim 26, wherein the second request is for demand data; and the method further comprises:

reading prefetch data in response to the second request; and satisfying the second request with prefetch data prior to completing reading all of the prefetch data in response to the second request.

28. An article comprising a machine-readable storage medium that stores executable instructions to:

read data in response to a request for a predetermined amount of data, the predetermined amount of data comprising prefetch data and demand data, the demand data comprising data for a computer program and the prefetch data comprising data adjacent to the demand data;

determine an amount of data that has been read prior to completing reading the predetermined amount of data;

satisfy a request for the demand data based on the amount of data that has been read prior to completing reading the predetermined amount of data; and wait for an amount of data to be read that is sufficient to satisfy the request for the demand data if the amount of data that has been read is not sufficient to satisfy the request for the demand data.

29. The article of claim 28, wherein determining comprises keeping track of the data as the data is read.

30. The article of claim 28, wherein determining comprises maintaining a count of data that has been read.

31. An article comprising a machine-readable storage medium that stores executable instructions to:

read data in response to a request for a first predetermined amount of data;

determine an amount of data that has been read prior to completing reading the first predetermined amount of data;

receive a second request for a second predetermined amount of data, the second predetermined amount of data being out of sequence relative to the first predetermined amount of data; and store an amount of data that has been read up to a point at which the second request is received.

32. The article of claim 31, wherein the first and second predetermined amounts of data comprise different sets of prefetch data and demand data, the demand data comprising data for a computer program and the prefetch data comprising data adjacent to the demand data.

33. The article of claim 32, wherein the second request is for demand data; and the article further comprises instructions to:

read prefetch data in response to the second request; and satisfy the second request with prefetch data prior to completing reading all of the prefetch data in response to the second request.

34. An apparatus comprising:

a memory which stores machine-executable instructions; and a processor which executes the instructions to:

read data in response to a request for a predetermined amount of data, the predetermined amount of data comprising prefetch data and demand data, the demand data comprising data for a computer program and the prefetch data comprising data adjacent to the demand data;

determine an amount of data that has been read prior to completing reading the predetermined amount of data; and satisfy a request for the demand data based on the amount of data that has been read prior to completing reading the predetermined amount of data;

wherein, if the amount of data that has been read is not sufficient to satisfy the request for the demand data, the processor executes instructions to wait for an amount of data to be read that is sufficient to satisfy the request for the demand data.

35. The apparatus of claim 34, wherein determining comprises keeping track of the data as the data is read.

36. The apparatus of claim 34, wherein determining comprises maintaining a count of data that has been read.

37. An apparatus comprising:

a memory which stores machine-executable instructions; and a processor which executes the instructions to:

read data in response to a request for a first predetermined amount of data;

determine an amount of data that has been read prior to completing reading the first predetermined amount of data;

receive a second request for a second predetermined amount of data, the second predetermined amount of data being out of sequence relative to the first predetermined amount of data; and store an amount of data that has been read up to a point at which the second request is received.

38. The apparatus of claim 37, wherein the first and second predetermined amounts of data comprising different sets of prefetch data and demand data, the demand data comprising data for a computer program and the prefetch data comprising data adjacent to the demand data.

39. The apparatus of claim 38, wherein the second request is for demand data; and the processor executes instructions to:

read prefetch data in response to the second request; and satisfy the second request with prefetch data prior to completing reading all of the prefetch data in response to the second request.

40. An apparatus comprising circuitry to:

initiate a read of prefetch data in response to a request for prefetch data;

before completion of the read of prefetch data, receive a request for demand data; and satisfy the request for demand data by providing at least a portion of the prefetch data prior to completing reading of all of the prefetch data.

41. The apparatus of claim 40, wherein, if the amount of prefetch data that has been read is not sufficient to satisfy the request for demand data, the circuitry waits for an amount of prefetch data to be read that is sufficient to satisfy the request for demand data.

42. The apparatus of claim 40, wherein the circuitry:

receives a second request for prefetch data, the prefetch data associated with the second request being out of sequence relative to the prefetch data associated with a first request for prefetch data; and stores an amount of prefetch data that has been read in response to the first request up to a point at which the second request is received.

* * * * *